(12) United States Patent
Vignet (10) Patent No.: US 8,204,880 B2
(45) Date of Patent: Jun. 19, 2012

(54) GENERIC TABLE GROUPER

(75) Inventor: Peter Vignet, San Francisco, CA (US)

(73) Assignee: SAP Aktiengesellschaft, Walldorf (DE)

( * ) Notice: Subject to any disclaimer, the term of this patent is extended or adjusted under 35 U.S.C. 154(b) by 662 days.

(21) Appl. No.: 11/943,296

(22) Filed: Nov. 20, 2007

(65) Prior Publication Data

US 2009/0132470 A1    May 21, 2009

(51) Int. Cl.
   *G06F 7/08* (2006.01)
(52) U.S. Cl. ........................................... 707/732
(58) Field of Classification Search ............ 707/764, 707/999.001, 732
   See application file for complete search history.

(56) References Cited

U.S. PATENT DOCUMENTS

| | | | | |
|---|---|---|---|---|
| 5,546,526 A | * | 8/1996 | Li et al. | 715/837 |
| 5,553,218 A | * | 9/1996 | Li et al. | 707/102 |
| 6,014,655 A | * | 1/2000 | Fujiwara et al. | 707/999.001 |
| 6,381,601 B1 | * | 4/2002 | Fujiwara et al. | 707/692 |
| 6,526,399 B1 | * | 2/2003 | Coulson et al. | 707/999.001 |
| 2002/0158899 A1 | * | 10/2002 | Raymond | 345/736 |
| 2006/0026154 A1 | * | 2/2006 | Altinel et al. | 707/5 |
| 2006/0058922 A1 | * | 3/2006 | Kruk et al. | 700/275 |

OTHER PUBLICATIONS

"Mainframe Express 2.5—User's Guide; Chapter 11: Editing Data Files", 2001, Micro Focus International.*
"Mainframe Express 2.5—User's Guide; Chapter 39: SQL Option for DB2", 2002 Micro Focus International.*
"Micro Focus Net Express", 2004, Micro Focus International.*
"Mainframe Express 2.5—User's Guide; Chapter 5: Security", 2001, Micro Focus International.*

* cited by examiner

*Primary Examiner* — Charles Kim
*Assistant Examiner* — Sheryl Holland
(74) *Attorney, Agent, or Firm* — Blakely Sokoloff Taylor & Zafman LLP (57) ABSTRACT

A system and process that groups identical values that are adjacent to one another within a column of a table. The system provides this functionality through an application and back-end implementation independent module. Custom grouping information for a table or columns within a table can be stored for retrieval each time a table is open or displayed. A user can manage the customizations through a centralized portal.

16 Claims, 6 Drawing Sheets

| Country ◆▶ | State ◆▶ | From ◆▶ | To ◆▶ | Date ◆▶ | Time ◆▶ | Cost ◆▶ | Icon ◆▶ | Drop Down ▶ |
|---|---|---|---|---|---|---|---|---|
| | Click on header to group/ungroup | | | | | | Un group All | Group All |
| Country_0 | State_0 | Town_0 | Town_1 | 8/28/2007 | 5:07:00 AM | 100 | — | Amitt |
| Country_0 | State_0 | Town_1 | Town_2 | 8/28/2007 | 5:07:00 AM | 100 | — | Elaine |
| Country_0 | State_0 | Town_2 | Town_3 | 8/28/2007 | 5:07:00 AM | 100 | — | Lucy |
| Country_0 | State_1 | Town_0 | Town_2 | 9/28/2007 | 7:08:01 AM | 110 | — | Elaine |
| Country_0 | State_1 | Town_1 | Town_3 | 9/28/2007 | 7:08:01 AM | 110 | — | Lucy |
| Country_0 | State_1 | Town_2 | Town_4 | 9/28/2007 | 7:08:01 AM | 110 | — | Peter |
| Country_0 | State_2 | Town_0 | Town_3 | 10/28/2007 | 9:09:02 AM | 120 | ✗ | Lucy |
| Country_0 | State_2 | Town_1 | Town_4 | 10/28/2007 | 9:09:02 AM | 120 | ✗ | Peter |
| Country_0 | State_2 | Town_2 | Town_5 | 10/28/2007 | 9:09:02 AM | 120 | ✗ | Tom |
| Country_1 | State_0 | Town_0 | Town_2 | 8/27/2007 | 7:07:00 AM | 205 | — | Elaine |
| Country_1 | State_0 | Town_1 | Town_3 | 8/27/2007 | 7:07:00 AM | 205 | — | Lucy |
| Country_1 | State_0 | Town_2 | Town_4 | 8/27/2007 | 7:07:00 AM | 205 | — | Peter |
| Country_1 | State_1 | Town_0 | Town_3 | 9/27/2007 | 9:08:01 AM | 215 | ✗ | Lucy |
| Country_1 | State_1 | Town_1 | Town_4 | 9/27/2007 | 9:08:01 AM | 215 | ✗ | Peter |
| Country_1 | State_1 | Town_2 | Town_5 | 9/27/2007 | 9:08:01 AM | 215 | ✗ | Tom |

Row 1 of 27

GENERIC TABLE GROUPER

BACKGROUND

1. Field of the Invention

The invention relates to table management. Specifically, the embodiments of the invention relate to a method and system for reorganizing tables to group redundant field values in columns and store and apply default column grouping customizations.

2. Background

Tables are utilized in a large number of different applications. The applications include spreadsheet applications such as EXCEL® by Microsoft Corporation of Redmond, Wash., supply chain management applications such as SCM by SAP AG of Waldorf, Germany, database applications such as MySQL by MySQL AB of Uppsala, Sweden and similar applications. These applications access stored data, draw a table, and insert the data into the table.

Tables are organizations of data as entries or records. Each entry or record includes a set of fields that are common amongst the entries. The entries can be displayed in rows and columns where each row corresponds to an entry and each column to a field of the entry. Often values in the fields of different entries are identical. Organizing entries with identical values in a given field can help the user establish relationships between the entries and identify information about the data set as a whole. The relationships between the entries can constitute a hierarchy of information within the table.

Some applications provide a grouping functionality to assist a user in understanding the data presented in a flat table. The grouping function is programmed and incorporated into the application by the application developer. The grouping function iterates through a selected column of a table and merges fields with identical values. The entries are reordered to be consistent with the resulting groupings. When the application is closed or a window containing the table is closed the grouping is lost and must be recreated by user direction upon a subsequent opening of the data.

SUMMARY

Embodiments of the invention include a system and process that groups identical values that are within a column of a table. The system provides this functionality through an application and backend implementation independent module. Custom grouping information for a table or columns within a table can be stored for retrieval each time a table is open or displayed. A user can manage the customizations through a centralized portal.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
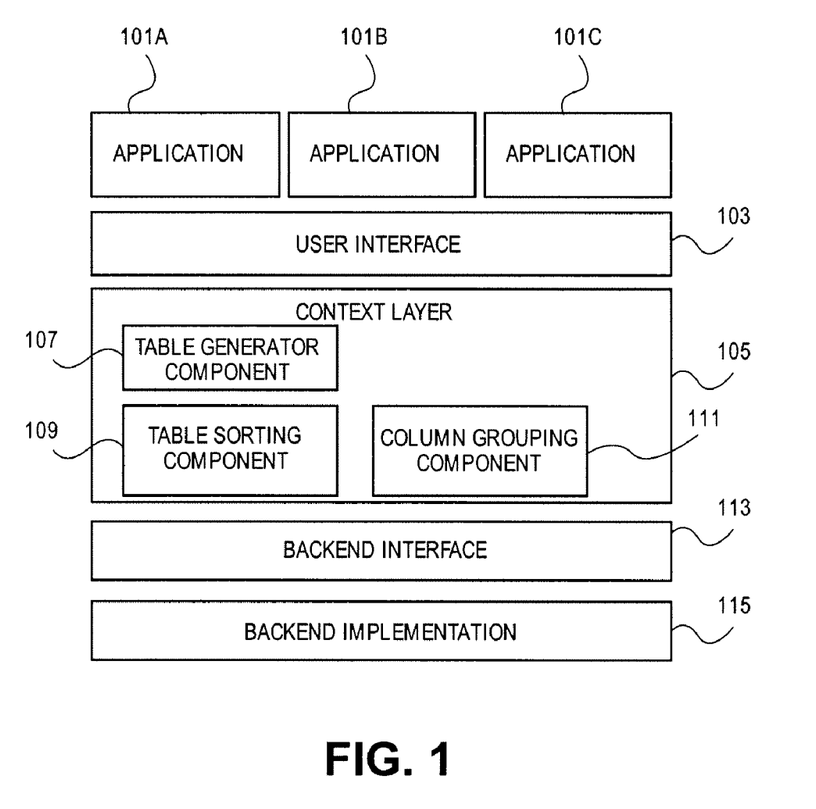
FIG. 1 is a diagram of a system for providing an application independent and backend implementation for column grouping and customization.

FIG. 1 is a diagram of a system for providing an application independent and backend implementation independent column grouping component 111. The system can include any number of applications 101A-C, a user interface layer 103, a context layer 105, a backend interface 113 and a backend implementation 115. The context layer can include a table sorting component 109 and a table generator 107. One skilled in the art would appreciate that the illustrated components are abstracted and could be implemented through any number of components in the form of software components, hardware components and combinations thereof.

The applications 101A-C can be any type of applications including word processing programs, spreadsheet applications, supply chain management applications, database management applications and similar types of applications that utilize and rely on tables to display sets of data to a user. A set, as used herein, refers to any positive whole number of items including one item. The system can include any number of applications 101A-C that can be executed by a single computer system or a set of computer systems. The applications 101A-C rely on a user interface layer 103 to generate basic aspects of the application interface.

The user interface layer 103 can be a library, set of classes or similar components that are utilized by applications to generate basic user interface elements such windows, menus, icons and similar user interface elements. The user interface layer 103 is implemented separately from the applications 101A-C to allow for reuse of the functionality of the user interface across applications, to provide a consistent style, to simplify programming requirements. The user interface layer 103 can be exposed to applications through an application programming interface (API) or similar interface, set of classes or library. The user interface layer 103 can be provided as part of an operating system, programming platform or environment such as Java® by Sun Microsystems of Santa Clara, Calif. or similar software.

The context layer 105 can be a library, set of classes or similar components that are utilized by applications to provide a software environment to the applications, including providing functionality and data to the user of the applications. The context layer 105 can store data including user data, environment data and similar data. The context layer 105 can also include a table generator component 107, a table sorting component 109 and a column grouping component 111 and similar components.

A table generator component 107 receives events, calls, interrupts or similar activities from applications 101A-C, the user layer 103 and other content layer components. For sake of clarity the example of servicing an event is presented. One skilled in the art would understand that other paradigms can operate on similar principles. The events can include an indicator for a table or similar table data. The indicator can be an object representing the table data, a link or pointer to the table data, an identifier for the table data or similar representation of the table data. The table generator component 107 can receive an indicator of a table to load from the backend implementation 115 through the backend interface 113 or that has already been loaded. The table generator component 107 organizes the loaded data into rows and columns and returns the organized data to the component that generated the event. In another embodiment, the table generator component 107 draws or similarly manipulates the data to be displayed to the user.

A table sorting component 109 receives events, calls, interrupts or similar activity from applications 101A-C, the user layer 103 and other context layer components. For sake of clarity the example of servicing an event is presented. One skilled in the art would understand that other paradigms can operate on similar principles. The events can include an indicator for a table or similar table data. The indicator can be an object representing the table data, a link or pointer to the table data, an identifier for the table data or similar representation of the table data. The table sorting component 109 reorganizes the data in a table. The table sorting component 109 may be able to perform any number of different types of sorting and filtering algorithms on the table data. The table sorting component 109 can reorder columns, rows or entries based on any criteria. The criteria can be user specified, application specific or similarly designated. The table sorting component 109 can return a pointer, indicator or similar link to reorganized data. In another embodiment, the table sorting component 109 can directly draw and manipulate the data shown to the user.

A column grouping component 111 receives an event, call, interrupt or similar activity from an application 101A-C, user layer 103 or other context layer component. For sake of clarity the example of servicing an event is presented. One skilled in the art would understand that other paradigms can operate on similar principles. The events can include an indicator for a table or similar table data. The indicator can be an object representing the table data, a link or pointer to the table data, an identifier for the table data or similar representation of the table data. The column grouping component 111 receives an indicator of a table and a set of columns to group. The column grouping component 111 identifies all of the identical values in the columns and merges those values into a single grouping. The column grouping component 111 may also reorder the rows of the table to accommodate the groupings of the set of columns. The column grouping component 111 may call the table sorting component 109 to further organize the entries within the groupings.

The backend interface (I/F) 113 is an abstraction of the communication components that allow the context layer 105, user interface layer 103 and applications 101A-C to communicate with a backend implementation 115. The backend interface 113 can be implemented using any combination of remote function calls (RFC), remote procedure calls (RPC), open database connectivity (ODBC), Java® database connectivity (JDBC) or similar backend communication and interfacing technologies. The backend interface 113 can vary depending on the type of backend implementation 115. In one embodiment, multiple backend implementations 115 can be utilized. Each backend implementation 115 can have a separate backend interface 113 or share any combination of backend interfaces 113.

The backend implementation 115 can be any server such as a database management system, file system, web server or similar program. The backend system provides and manages data utilized by the applications 101C including application and user data. The backend implementation 115 can store table data, customization data, user data and similar types of data to be accessed by the applications 101A-C. The backend implementation 115 can be local to the machines executing the applications 101A-C or remote from the machines executing the applications 101A-C. The backend implementation 115 can exchange data with the applications through the backend interface 113. The data provided by the backend system is stored on fixed disks, such as hard drives, optical drives and similar storage systems. As a result, the access times for the data provided by the backend implementation can be on the order of milliseconds, seconds or longer. Thus, it can be advantageous to minimize the number of times that the backend system is accessed to improve performance of the applications 101A-C.

The context layer 105 improves overall system performance including application 101A-C performance by storing data such as the table data and performing functions such as table generation, sorting and grouping. Storing this data locally and performing these functions independent of the backend system 115 minimizes the number of accesses to the backend system 115.

The components of the context layer 105 are independent of the backend implementation 115 and the applications 101A-C. Thus, the applications do not have to replicate the functionality of the context layer components or manage the storage of the data in the context layer 105. Similarly, the applications 101A-C do not have to communicate with the backend implementation 115 to retrieve and manipulate the table data to maintain.

Figure 2:
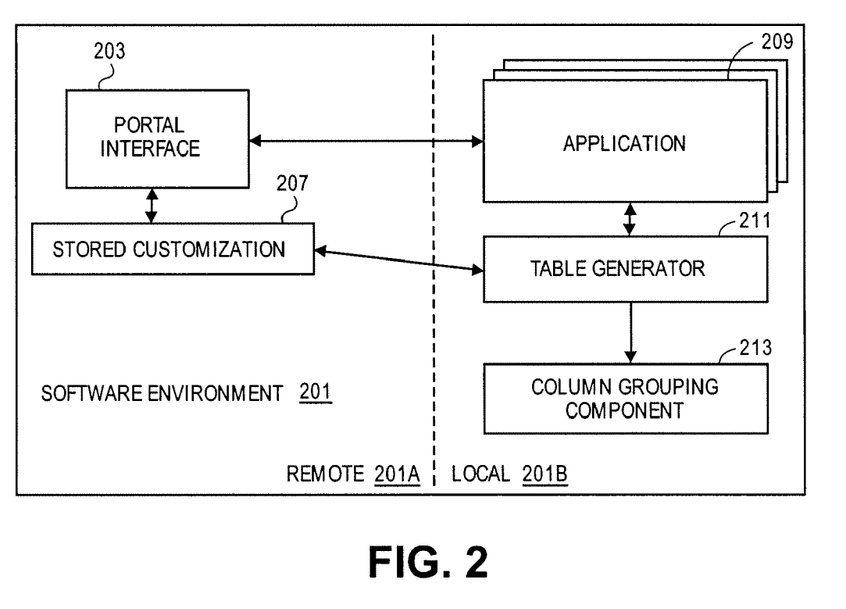
FIG. 2 is a diagram of one embodiment of a customization system.

FIG. 2 is a diagram of one embodiment of a customization system. The customization system includes a portal interface 203, stored customization data 207, applications 209, table generator component 211, column grouping component 213 and similar components. These components can be a part of a whole software environment 201 or separate software environments. In one embodiment, the portal interface 203 and stored components can be part of a remote software environment 201A hosted by a server or similar system. The applications 209, table generator 211, column grouping component 213 and similar components can be a part of a local software environment 201B on a local machine such as a desktop or similar machine. The local software environment 201B and remote software environment 201A may share a set of communication protocols and mechanisms to facilitate the exchange of data irrespective of the location of the given components.

A portal interface 203 can be a web based interface that presents a user interface through a web page or similar document accessible by a web browser or similar application to allow a user or administrator to customize application settings and similar settings. In one embodiment, the portal interface 203 is accessible by a general purpose application such as a web browser or the portal interface 203 is accessible through an application 209 of the local software environment 201B. The user or administrator customizations are stored in a data structure 207 accessible to the portal interface 203 and the components of the local software environment 201B.

The stored customization 207 can be any type of data structure. The data structure can be a database, hash table, list, object or similar data structure. The stored customization can be stored in an recordable medium including a set of a fixed disks, removable memory devices, flash memory devices or similar memory devices. The stored customization can be distributed across multiple storage media or stored in a centralized storage device such as a central data store. The stored customization 207 can be directly or indirectly accessible by other components of the software environment 201. The stored customization 207 can include security controls to limit access to user customizations to those application and components associated with that user.

The applications 209 can access and interact with the portal interface 203 and stored customizations 207. The applications 209 can include an interface or link to access the portal interface to allow a user to update and view customizations for the application in user or other applications. The application 209 can also access either directly or indirectly the stored customization data 207 to configure the application 209 according to the stored customizations including customization relating to the creation and display of tables by the application 209.

The table generator 211 or similar component can also have access to the stored customization data 207 or the portal interface 203. The table generator 211 can service requests from applications 209 to generate tables for display. The table generator 211 or application then accesses the portal interface 203 or stored customization data 207 to determine whether any customizations need to be applied to a table to be generated. For example, a user can established an order to table columns and settings for which columns are to be grouped. The table generator 211 in response to the retrieval of the grouping customization data can call a column grouping component 213 to effect the customized grouping settings.

Figure 3:
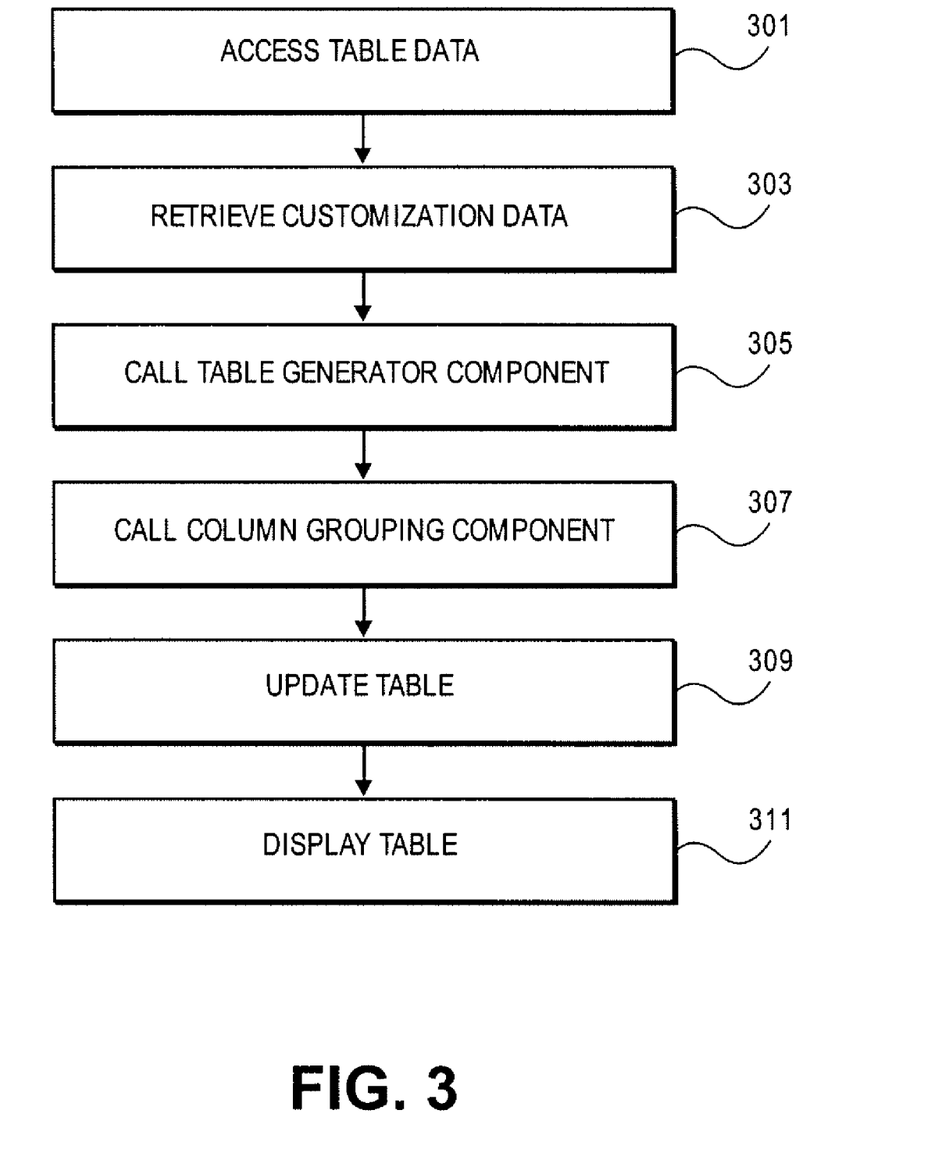
FIG. 3 is a flowchart of one embodiment of a process for applying customized grouping data.

FIG. 3 is a flowchart of one embodiment of a process for applying customized grouping data. A user interacts with an application and requests the display or opening of a document containing a table or directly opens a table. The application then initiates a process for accessing the table data (block 301). The application can retrieve the data from the database or similar storage location that holds the table data or can make a call to a table generator component indicating the table to be retrieved.

In one embodiment, the application may also access the customization data for the requested table through the portal interface or may directly access the customization data. The customization data can be requested from the portal interface or customization data storage and, if present, the requested data is returned to the application (block 303). In another embodiment, the table generator accesses the customization data for the requested table through the portal interface or may directly access the customization data. In an embodiment where the application retrieves the customization data, the application may then pass the customization data on to the table generator (block 305).

In an embodiment, where the application does not pass the customization data on to the table generator then the application calls the column grouping component (block 307) as needed to create the column groupings required by the customization data. A table generator that is passed the customization data can similarly call the column grouping component. The application, table generator and column grouping component each manipulate the table data as required by the customization data (block 309). After each customization has been implemented the application displays the table as requested by the user (block 311). The division of functionality between the table generator component, column grouping component and application can be implemented in a variety of distributions. In each case, the table generator component and column grouping component are implemented independent of the application and the backend implementation. This allows the application to utilize the functionality of the table generator component and column grouping component without regard to the backend implementation.

Figure 4:
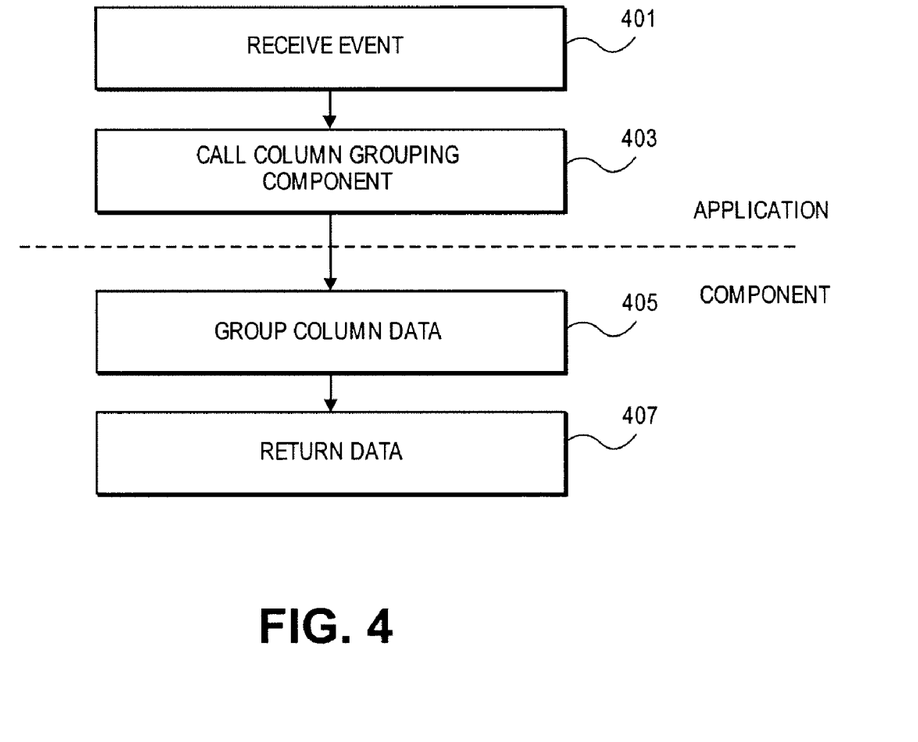
FIG. 4 is a flowchart of one embodiment of a process for grouping table data.

FIG. 4 is a flowchart of one embodiment of a process for grouping table data. During the execution of an application that is presenting or displaying a table to the user, an event may be received (block 401). The event can be generated in response to an interaction with a user interface input mechanism, a table operation or similar action. The user interface interaction can be through a user input mechanism such as a button, menu or similar user interface input mechanism. For example, a user can select a 'group' or 'group all' button associated with a column or other aspect of a table. The application then generates a call to the column grouping component including an indicator of the table and column that the grouping is to be applied to (block 403).

The column grouping component receives the call from the application. It accesses the table data including the column to be grouped. The column grouping component then iterates through the values of the column to identify and group identical values. Identical values are merged into a single value (block 405). The entries associated with grouped values are reordered to allow them to be adjacent to one another. The entries may be kept in relative entry order prior to grouping or may be sorted and reordered based on any criteria or scheme.

The column grouping component then returns the table data or an indicator of the reorganized table to be accessed or made available to the requesting applications. The column grouping component can work on table data stored in the context layer to avoid having to access table data in the backend implementation. The column grouping component can have a standard interface or be part of an application programming interface (API) or similar library that is back-end implementation independent.

Figure 5:
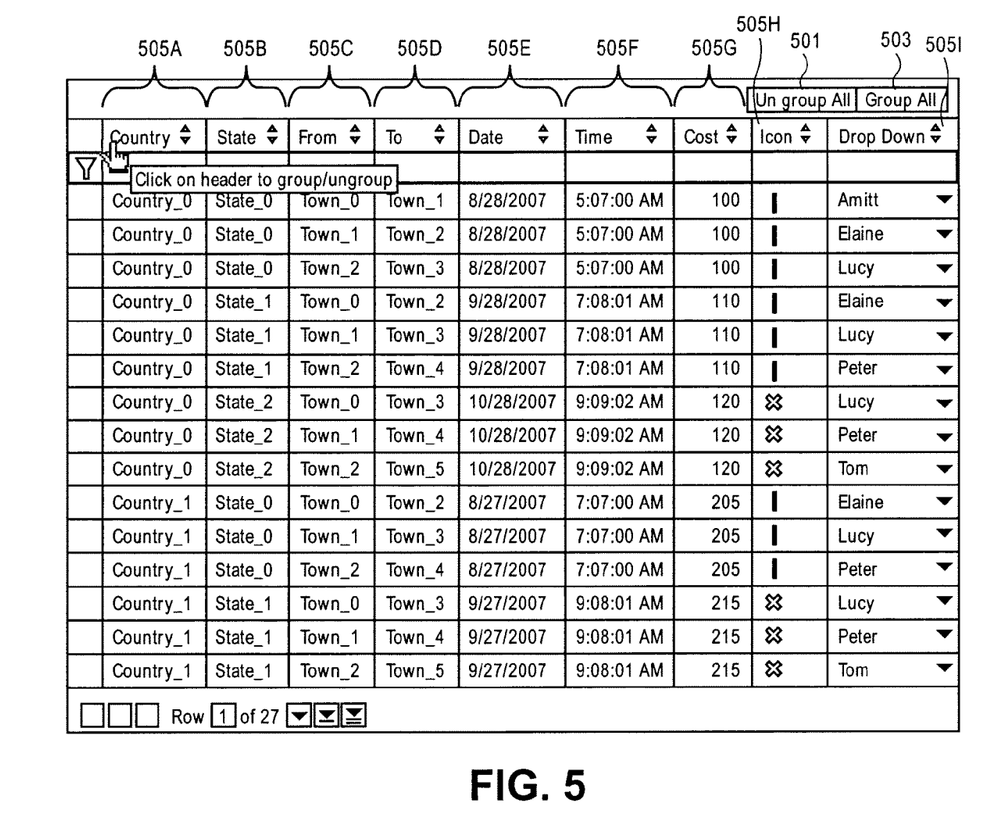
FIG. 5 is a diagram of one embodiment of a flat table.

FIG. 5 is a diagram of one embodiment of a flat table. The table illustrated in FIG. 5 is an example flat table. The table has twenty seven entries and includes values for each entry in the nine columns 505A-I. The columns 505A-I each include a header with a label (e.g., 'country' and 'state'). In the example embodiment, the label is also a button that can be selected to group that column. The table also includes separate buttons that allow a user to group all of the columns 503 or ungroup all of the columns 501. These button can activate special functionality in the column grouping component or cause the application to iterate through each column to group each column using the column grouping component.

In one example, the columns illustrated are in their default organization. No columns are grouped or otherwise reorganized from the default table format.

Figure 6:
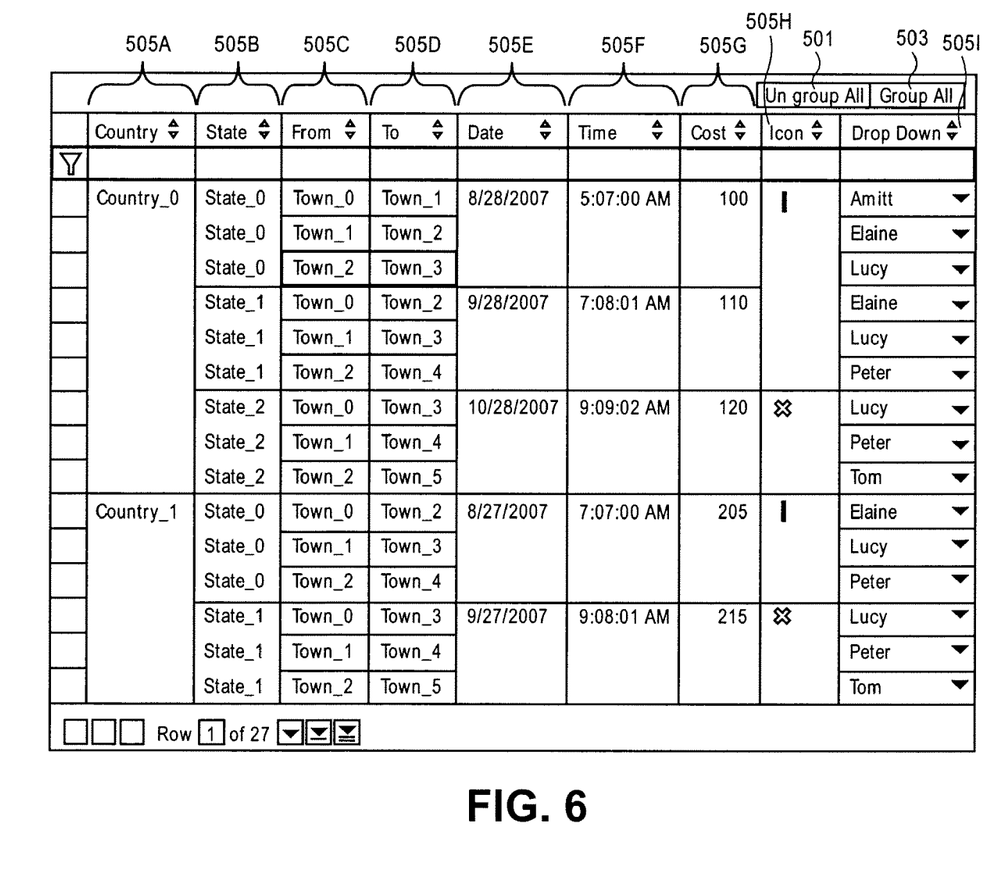
FIG. 6 is a diagram of one embodiment of the flat table with all grouped columns.

FIG. 6 is a diagram of one embodiment of the flat table with grouped columns. The table of FIG. 6 has had a custom grouping scheme applied to it after loading in the default table format. Columns 505A, 505B, 505E 505F, 505G and 505H have each been grouped. Further, the grouping has been done in a particular order of priority. The first column 505A has been given the highest priority and the other columns have been grouped within the grouping of 505A such that the grouping of other columns does not affect that column. The group all 503 and ungroup all 501 buttons are still present and can be activated to change the customization order. In a further embodiment, the table interface can include a customization button that loads a stored customization scheme and applies it to the table. If another embodiment, an input mechanism such as a button or menu item can be made available to allow a user to specify or design a customization configuration or to open the customization portal to allow the user to access the customization features.

In one embodiment, the column grouping and customization system may be implemented as hardware devices. In another embodiment, these components may be implemented in software (e.g., microcode, assembly language or higher level languages). These software implementations may be stored on a machine-readable medium. A "machine readable" medium may include any medium that can store or transfer information. Examples of a machine readable medium include a ROM, a floppy diskette, a CD-ROM, a DVD, flash memory, hard drive, an optical disk or similar medium.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
   receiving a request for column grouping of a table having a plurality of columns, the request received from an application;
   executing a column grouping algorithm by a column grouping component in response to the request, the column grouping algorithm defining a column grouping order when applied causes a table rearrangement in which all identical entries within at least a first selected column are adjacent to each other and all identical entries in a second column that are in a row also having identical entries in the first column are adjacent to each other, wherein the column grouping component is an application independent and back end independent component such that an interface between the application and the column grouping component is independent of the application accessing the interface and the use of the column grouping component by the application is transparent to a user;
   traversing column data of the table to locate adjacent identical entries;
   merging adjacent identical entries; and
   returning the table rearrangement to the application.

2. The method of claim 1, further comprising:
   receiving column data as a parameter of the column grouping component.

3. The method of claim 1, further comprising:
   grouping each column of the table by the column grouping component such that the column grouping defines an arrangement in which identical column entries within each column are arranged to be adjacent to each other subject to the column grouping order.

4. The method of claim 1, further comprising:
   receiving a request to ungroup all columns by the column grouping component; and
   ungrouping each column of the table by the column grouping component.

5. A method comprising:
   providing an interface to manage application settings, the application settings including a default configuration of column grouping wherein column grouping defines a hierarchy in which common values within one or more columns are group together on a per column basis such that all identical entries within at least a first selected column are adjacent to each other and all identical entries in a second column that are in a row also having identical entries in the first column are adjacent to each other;
   receiving a customization for the default configuration of column groupings through the interface the customization defining that adjacent identical entries are merged together when displayed; and
   storing the customization in a file to be accessed by an application upon creation or opening of a table to implement the customization for default configuration of a column.

6. The method of claim 5, wherein the interface is a portal interface.

7. The method of claim 5, further comprising:
   storing a customization for column grouping for a specific table or column of a table.

8. The method of claim 5, further comprising:
   storing the customization in a format accessible to an application independent and back end independent column grouping component.

9. The method of claim 5, wherein the customization is user specific data.

10. The method of claim 5, wherein the customization is system wide as specified by an administrator.

11. The method of claim 5, further comprising:
    storing a group all setting in the customization file.

12. The method of claim 6, wherein the portal is a web based portal.

13. A non-transitory machine readable medium, having instructions stored therein, which when executed cause the machine to perform a set of operations, comprising:
    receiving call from an application, the application independent from a call recipient, the call including table data;
    executing a column grouping algorithm on at least one column of the table data by a column grouping component in response to the call, the column grouping algorithm defining a column grouping order when applied causes a table rearrangement in which all identical entries within at least a first selected column are adjacent to each other and all identical entries in a second column that are in a row also having identical entries in the first column are adjacent to each other, the column grouping component is an application independent and back end independent component;
    traversing column data of the table to locate adjacent identical entries;
    merging adjacent identical entries; and
    returning the table data as rearranged to the application transparently to a user of the application.

14. The non-transitory machine readable medium of claim 13, having further instructions stored therein, which when executed cause the machine to perform a further set operations comprising:
    parsing column data from the table data by the column grouping component.

15. The non-transitory machine readable medium of claim 13, having further instructions stored therein, which when executed cause the machine to perform a further set operations comprising:
    receiving a request to group all columns in the table data by the column grouping component; and
    grouping each column of the table data by the column grouping component, such that identical column entries within each column are arranged to be adjacent to each other subject to the column grouping order.

16. The non-transitory machine readable medium of claim 13, having further instructions stored therein, which when executed cause the machine to perform a further set operations comprising:
    receiving a request to ungroup all columns in the table data by the column grouping component; and
    ungrouping each column of the table data by the column grouping component.

* * * * *